(12) United States Patent
Kondo et al.

(10) Patent No.: US 11,679,801 B2
(45) Date of Patent: Jun. 20, 2023

(54) STEERING DEVICE AND METHOD FOR DETECTING ANOMALY IN STEERING DEVICE

(71) Applicant: JTEKT CORPORATION, Osaka (JP)

(72) Inventors: Yoshio Kondo, Okazaki (JP); Toshiaki Ogata, Okazaki (JP); Fumio Kishida, Toyota (JP); Keishi Nakamura, Okazaki (JP); Hirohide Suzuki, Nisshin (JP)

(73) Assignee: JTEKT CORPORATION, Osaka (JP)

( * ) Notice: Subject to any disclaimer, the term of this patent is extended or adjusted under 35 U.S.C. 154(b) by 394 days.

(21) Appl. No.: 16/997,208

(22) Filed: Aug. 19, 2020

(65) Prior Publication Data

US 2021/0053612 A1    Feb. 25, 2021

(30) Foreign Application Priority Data

Aug. 22, 2019  (JP) .............................. JP2019-152197
Jun. 12, 2020  (JP) .............................. JP2020-102318

(51) Int. Cl.
*B62D 5/04*     (2006.01)
*B62D 15/02*    (2006.01)

(52) U.S. Cl.
CPC ......... *B62D 5/0448* (2013.01); *B62D 5/0421* (2013.01); *B62D 5/0481* (2013.01); *B62D 15/0245* (2013.01)

(58) Field of Classification Search
CPC .. B62D 5/0448; B62D 5/0421; B62D 5/0481; B62D 15/0245; B62D 5/0424; B62D 5/04; F16H 2025/2096
See application file for complete search history.

(56) References Cited

U.S. PATENT DOCUMENTS 8,924,058 B2 * 12/2014 Jung ..................... B60W 20/50
                                                                 701/22
11,472,478 B2 * 10/2022 Shibata ................. B60W 10/20
(Continued)

FOREIGN PATENT DOCUMENTS

JP  2006-347209 A   12/2006
WO  2017/060042 A1  4/2017

OTHER PUBLICATIONS

Feb. 15, 2021 Search Report issued in European Patent Application No. 20191339.9.

(Continued)

*Primary Examiner* — Sze-Hon Kong
(74) *Attorney, Agent, or Firm* — Oliff PLC

(57) ABSTRACT

A steering device includes a steering rod that includes two ball screw parts, the steering rod being configured to steer a steerable wheel by moving linearly, two ball nuts respectively fastened to the two ball screw parts, two motors each configured to generate a drive force, two transmission mechanisms each including a toothed belt, the two transmission mechanisms being configured to transmit the drive force of each one of the two motors to a corresponding one of the ball nuts, two detectors configured to respectively detect rotation angles of the two motors, and a controller configured to control each of the two motors. The controller is configured to detect tooth jumping of the belts using the rotation angles of the two motors that are detected by the two detectors.

7 Claims, 7 Drawing Sheets

(56) References Cited

U.S. PATENT DOCUMENTS

| | | | |
|---|---|---|---|
| 2003/0221896 A1* | 12/2003 | Sasaki | B62D 5/0448 |
| | | | 180/444 |
| 2004/0040778 A1 | 3/2004 | Katou et al. | |
| 2009/0091093 A1* | 4/2009 | Urababa | B60G 21/0555 |
| | | | 280/5.511 |
| 2012/0097470 A1* | 4/2012 | Yamasaki | B62D 5/0427 |
| | | | 180/402 |
| 2013/0030653 A1* | 1/2013 | Soos | B62D 15/0235 |
| | | | 701/41 |
| 2014/0172236 A1* | 6/2014 | Nishikawa | B62D 5/003 |
| | | | 701/42 |
| 2014/0316641 A1* | 10/2014 | Wu | F02B 77/081 |
| | | | 701/33.9 |
| 2017/0120947 A1* | 5/2017 | Kim | F16H 7/16 |
| 2018/0281846 A1 | 10/2018 | Schreiner | |
| 2018/0354548 A1* | 12/2018 | Eickholt | F16H 55/36 |
| 2019/0036470 A1 | 1/2019 | Hashimoto et al. | |
| 2020/0023888 A1 | 1/2020 | Horitake | |
| 2020/0309566 A1* | 10/2020 | Fujita | G01L 5/221 |
| 2021/0016824 A1* | 1/2021 | Ishige | B62D 5/0463 |
| 2022/0194462 A1* | 6/2022 | Sakuma | B62D 5/0463 |
| 2022/0205868 A1* | 6/2022 | Fiss | F16H 57/01 |

OTHER PUBLICATIONS

U.S. Appl. No. 16/997,236, filed Aug. 19, 2020 in the name of Kondo et al.
Nov. 16, 2022 Office Action issued in U.S. Appl. No. 16/997,236.

* cited by examiner

STEERING DEVICE AND METHOD FOR DETECTING ANOMALY IN STEERING DEVICE

BACKGROUND

1. Field

The present disclosure relates to a steering device that steers steerable wheels of a vehicle and to a method for detecting an anomaly in the steering device.

2. Description of Related Art

In a typical known steer-by-wire type steering system, the transmission of power between the steering wheel and steerable wheels is mechanically separated. Japanese Laid-Open Patent Publication No. 2006-347209 describes an example of a steering system including two motors arranged coaxially on a steering rod that steers the steerable wheels. The two motors each include a rotor that is arranged integrally with a ball nut. The ball nuts are fastened to ball screws on the steering rod by a large number of balls. Rotation of the two motors is converted into linear motion of the steering rod by ball screw mechanisms including the ball nuts.

There are various types of mechanisms that transmit the rotation of the motor to the steering rod. Depending on product specifications, for example, it might be possible to employ a belt transmission mechanism as a transmission mechanism. In this case, the output shaft of the motor and the ball nut are each provided with a pulley, and an endless belt is wound around the pulleys. The rotation of the motor is transmitted from the pulley on the output shaft through the belt to the pulley on the ball nut. As the ball nut rotates in conjunction with the driving of the motor, the steering rod moves in its axial direction.

In the steering device, when the belt transmission mechanism is employed as a mechanism that transmits the rotation of the motor to the steering rod, toothed pulleys and a toothed belt may be respectively employed as two pulleys and a belt in order to transmit the rotation of the motor to the steering rod more properly. In such a structure, the teeth of the pulleys mesh with the teeth of the belt to transmit the rotation of the motor to the steering rod without slippage. However, the use of the toothed pulleys and toothed belt may cause the following problem.

More specifically, a large reverse input load may act on the steering rod due to, for example, the vehicle driving over a curb. In this case, the movement of the steering rod in its axial direction may cause the end of the steering rod to strike a housing, which is referred to as an end striking. In this case, physically restricting the movement of the steering rod restricts the rotation of the ball nut and the belt. By contrast, the motor and the pulley on the output shaft of the motor attempt to continue to rotate due to the inertial force of the motor and the pulley. This may cause tooth jumping in the belt. In tooth jumping, the teeth of the belt climb over the teeth of the pulley when they do not mesh with each other properly.

When tooth jumping of the belt repeatedly occurs, wear of the teeth of the belt develops. Consequently, this may lower the quietness and torque transmission efficiency of the belt transmission mechanism. Accordingly, to take some measure against the occurrence of tooth jumping of the belt, it is desired that tooth jumping of the belt be detected.

SUMMARY

It is an object of the present disclosure to provide a steering device capable of detecting tooth jumping of a belt and a method for detecting an anomaly in the steering device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A steering device according to an aspect of the present disclosure includes a steering rod that includes two ball screw parts, the steering rod being configured to steer a steerable wheel by moving linearly, two ball nuts respectively fastened to the two ball screw parts, two motors each configured to generate a drive force, two transmission mechanisms each including a toothed belt, the two transmission mechanisms being configured to transmit the drive force of each one of the two motors to a corresponding one of the ball nuts, two detectors configure to respectively detect rotation angles of the two motors, and a controller configured to control each of the two motors. The controller is configured to detect tooth jumping of the belts using the rotation angles of the two motors that are detected by the two detectors.

In a method for detecting an anomaly in a steering device according to an aspect of the present disclosure, the steering device includes a steering rod configured to steer a steerable wheel by moving linearly, two ball nuts respectively fastened to two ball screw parts of the steering rod, and two transmission mechanisms configured to transmit a drive force of each one of two motors to a corresponding one of the ball nuts through toothed belts. The method includes detecting, by two detectors, rotation angles of the two motors, respectively, and detecting tooth jumping of the belts using the rotation angles of the two motors that are detected by the two detectors.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A steering device 10 for a vehicle according to a first embodiment will now be described.

Figure 1:
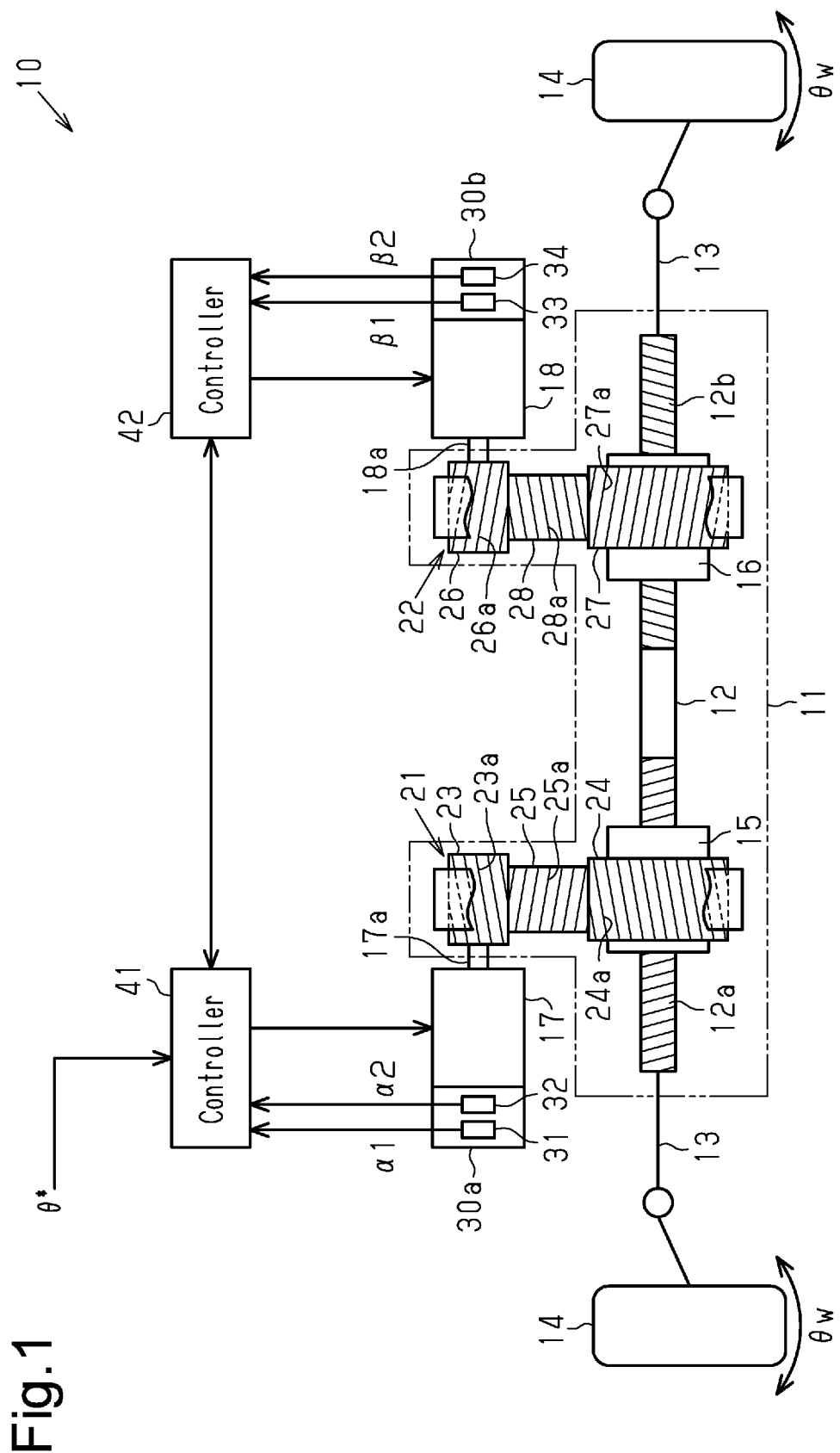
FIG. 1 is a diagram showing the structure of a steering device in a first embodiment.

As shown in FIG. 1, the steering device 10 includes a housing 11, which is fixed to a vehicle body (not shown). The housing 11 accommodates a steering rod 12, which extends in the left-right direction of the vehicle body (left-right direction in FIG. 1). Steerable wheels 14 are coupled to opposite ends of the steering rod 12 by tie rods 13, respectively. Movement of the steering rod 12 in its axial direction changes steerable angles θw of the steerable wheels 14.

The steering rod 12 includes a first ball screw part 12a and a second ball screw part 12b. The first ball screw part 12a is located closer to a first end, which is the left end of the steering rod 12 in FIG. 1. The first ball screw part 12a is provided with a right-hand thread over a predetermined range. The second ball screw part 12b is located closer to a second end, which is the right end of the steering rod 12 in FIG. 1. The second ball screw part 12b is provided with a left-hand thread over a predetermined range.

The steering device 10 includes a first ball nut 15 and a second ball nut 16. The first ball nut 15 is fastened to the first ball screw part 12a of the steering rod 12 by multiple balls (not shown). The second ball nut 16 is fastened to the second ball screw part 12b of the steering rod 12 by multiple balls (not shown).

The steering device 10 includes a first motor 17 and a second motor 18. The first motor 17 and the second motor 18 are generation sources of steering force, which is the power to steer the steerable wheels 14. The first motor 17 and the second motor 18 are, for example, three-phase brushless motors. The first motor 17 and the second motor 18 are fixed to outer portions of the housing 11. The first motor 17 and the second motor 18 respectively include an output shaft 17a and an output shaft 18a, which extend in parallel to the steering rod 12.

The steering device 10 includes a first transmission mechanism 21 and a second transmission mechanism 22.

The first transmission mechanism 21 includes a driving pulley 23, a driven pulley 24, and an endless belt 25. The driving pulley 23 is fixed to the output shaft 17a of the first motor 17. The driven pulley 24 is fitted and fixed to the outer circumferential surface of the first ball nut 15. The belt 25 is looped between the driving pulley 23 and the driven pulley 24. Thus, rotation of the first motor 17 is transmitted to the first ball nut 15 through the driving pulley 23, the belt 25, and the driven pulley 24.

The driving pulley 23 is a toothed pulley. The outer circumferential surface of the driving pulley 23 is provided with teeth 23a. The tooth traces of the teeth 23a of the driving pulley 23 are inclined with respect to the axis of the driving pulley 23. The driven pulley 24 is also a toothed pulley. The outer circumferential surface of the driven pulley 24 is provided with teeth 24a. The tooth traces of the teeth 24a of the driven pulley 24 are inclined with respect to the axis of the driven pulley 24 and oriented in the same direction as the direction of the tooth traces of the driving pulley 23. Further, the belt 25 is a toothed belt. The inner circumferential surface of the belt 25 is provided with teeth 25a. The tooth traces of the teeth 25a of the belt 25 are inclined in correspondence with the tooth traces of the driving pulley 23 and the tooth traces of the driven pulley 24.

In the same manner as the first transmission mechanism 21, the second transmission mechanism 22 includes a driving pulley 26, a driven pulley 27, and an endless belt 28. The driving pulley 26 is fixed to the output shaft 18a of the second motor 18. The driven pulley 27 is fitted and fixed to the outer circumferential surface of the second ball nut 16. The belt 28 is looped between the driving pulley 26 and the driven pulley 27. Thus, rotation of the second motor 18 is transmitted to the second ball nut 16 through the driving pulley 26, the belt 28, and the driven pulley 27.

The driving pulley 26 is a toothed pulley. The outer circumferential surface of the driving pulley 26 is provided with teeth 26a. The tooth traces of the teeth 26a of the driving pulley 26 are inclined with respect to the axis of the driving pulley 26. The driven pulley 27 is also a toothed pulley. The outer circumferential surface of the driven pulley 27 is provided with teeth 27a. The tooth traces of the teeth 27a of the driven pulley 27 are inclined with respect to the axis of the driven pulley 27 and oriented in the same direction as the direction of the tooth traces of the driving pulley 26. Further, the belt 28 is a toothed belt. The inner circumferential surface of the belt 28 is provided with teeth 28a. The tooth traces of the teeth 28a of the belt 28 are inclined in correspondence with the tooth traces of the driving pulley 26 and the tooth traces of the driven pulley 27.

The deceleration ratio from the first motor 17 to the steering rod 12 is equal to the deceleration ratio from the second motor 18 to the steering rod 12. The lead of the first ball screw part 12a of the steering rod 12 is equal to the lead of the second ball screw part 12b of the steering rod 12. Thus, the movement amount of the steering rod 12 per rotation of the first motor 17 is equal to the movement amount of the steering rod 12 per rotation of the second motor 18.

The steering device 10 includes a first detector 30a, which detects the rotation angle of the first motor 17, and a second detector 30b, which detects the rotation angle of the second motor 18. The first detector 30a is arranged in the first motor 17. The first detector 30a includes a first rotation angle sensor 31 and a second rotation angle sensor 32. The second detector 30b is arranged in the second motor 18. The second detector 30b includes a third rotation angle sensor 33 and a fourth rotation angle sensor 34. The four rotation angle sensors 31 to 34 are, for example, resolvers. The detection range of the two rotation angle sensors 31 and 32 is 360°, which corresponds to a single cycle of the electrical angle of the first motor 17. The detection range of the two rotation angle sensors 33 and 34 is 360°, which corresponds to a single cycle of the electrical angle of the second motor 18.

The first rotation angle sensor 31 detects a rotation angle α1 of the first motor 17. The first rotation angle sensor 31 generates a first sine signal (sin signal) and a first cosine signal (cos signal). The first sine signal is an electrical signal that changes in a sine waveform in correspondence with the rotation of the first motor 17. The first cosine signal is an electrical signal that changes in a cosine waveform in correspondence with the rotation of the first motor 17. The first rotation angle sensor 31 calculates, as the rotation angle α1 of the first motor 17, an arctangent that is based on the first sine signal and the first cosine signal. The rotation angle α1 changes in a sawtooth waveform in a cycle corresponding to an axial double angle of the first rotation angle sensor 31. That is, the rotation angle α1 changes so as to repeat rise and steep fall in correspondence with the rotation of the first motor 17.

The second rotation angle sensor 32 detects a rotation angle α2 of the first motor 17. The second rotation angle sensor 32 has the same configuration and function as the first rotation angle sensor 31. The first rotation angle sensor 31 and the second rotation angle sensor 32 configure a redundant system of the rotation angle sensors of the first motor 17.

The third rotation angle sensor 33 detects a rotation angle β1 of the second motor 18. The third rotation angle sensor 33 generates a third sine signal and a third cosine signal. The third sine signal is an electrical signal that changes in a sine waveform in correspondence with the rotation of the second motor 18. The third cosine signal is an electrical signal that changes in a cosine waveform in correspondence with the rotation of the second motor 18. The third rotation angle sensor 33 calculates, as the rotation angle β1 of the second motor 18, an arctangent that is based on the third sine signal and the third cosine signal. The rotation angle β1 changes in a sawtooth waveform in a cycle corresponding to an axial double angle of the third rotation angle sensor 33.

The fourth rotation angle sensor 34 detects a rotation angle β2 of the second motor 18. The fourth rotation angle sensor 34 has the same configuration and function as the third rotation angle sensor 33. The third rotation angle sensor 33 and the fourth rotation angle sensor 34 configure a redundant system of the rotation angle sensors of the second motor 18.

The first rotation angle sensor 31 and the third rotation angle sensor 33 have axial double angles that differ from each other. The second rotation angle sensor 32 and the fourth rotation angle sensor 34 have axial double angles that differ from each other. The axial double angle refers to the ratio of the electrical angle of an electrical signal to the rotation angle indicated by the mechanical angle of the first motor 17 and the second motor 18. For example, when the first rotation angle sensor 31 generates an electrical signal corresponding to a single cycle during a single rotation of the first motor 17, the axial double angle of the first rotation angle sensor 31 is a single angle (1X). When the first rotation angle sensor 31 generates an electrical signal corresponding to four cycles during a single rotation of the first motor 17, the axial double angle of the first rotation angle sensor 31 is a quadruple angle (4X).

Since the first rotation angle sensor 31 and the third rotation angle sensor 33 have axial double angles that differ from each other and the second rotation angle sensor 32 and the fourth rotation angle sensor 34 have axial double angles that differ from each other, the number of cycles of the rotation angles α1 and α2 per rotation of the first motor 17 and the number of cycles of the rotation angles θ1 and β2 per rotation of the second motor 18 differ from each other. In addition, the value of the rotation angle indicated by the mechanical angle of the first motor 17 per cycle of the electrical signal generated by the first rotation angle sensor 31 and the second rotation angle sensor 32 is different from the value of the rotation angle indicated by the mechanical angle of the second motor 18 per cycle of the electrical signal generated by the third rotation angle sensor 33 and the fourth rotation angle sensor 34.

The first motor 17 is coupled to the steering rod 12 and consequently to the steerable wheels 14 by the first transmission mechanism 21. The second motor 18 is coupled to the steering rod 12 and consequently to the steerable wheels 14 by the second transmission mechanism 22. Thus, each of the rotation angles α1 and α2 of the first motor 17 and the rotation angles (31 and β2 of the second motor 18 is a value on which the absolute position in the axial direction of the steering rod 12 and consequently the steerable angles of the steerable wheels 14 are reflected.

The steering device 10 includes a first controller 41 and a second controller 42. The first controller 41 may be circuitry including: 1) one or more processors that operate according to a computer program (software); 2) one or more dedicated hardware circuits such as application specific integrated circuits (ASICs) that execute at least part of various processes; or 3) a combination thereof. The processor includes a CPU and memories such as a RAM and a ROM. The memories store program codes or commands configured to cause the CPU to execute processes. The memories, or non-transitory computer readable media, include any type of media that are accessible by general-purpose computers and dedicated computers. The second controller 42 has the same configuration as the first controller 41.

The first controller 41 controls the first motor 17. The first controller 41 obtains a target steerable angle θ*. The target steerable angle θ* is calculated by, for example, an onboard upper controller in correspondence with the steering state or traveling state of the vehicle. The first controller 41 obtains the rotation angle α1 of the first motor 17, which is detected by the first rotation angle sensor 31, and the rotation angle α2 of the first motor 17, which is detected by the second rotation angle sensor 32. Further, the first controller 41 obtains the rotation angle β1 of the second motor 18, which is detected by the third rotation angle sensor 33, and the rotation angle β2 of the second motor 18, which is detected by the fourth rotation angle sensor 34.

The first controller 41 executes a steering control that steers the steerable wheels 14 in correspondence with the steering state by driving and controlling the first motor 17.

When starting the execution of the steering control, the first controller 41 uses the rotation angle α1 of the first motor 17, which is detected by the first rotation angle sensor 31, and the rotation angle β1 of the second motor 18, which is detected by the third rotation angle sensor 33, to execute an initialization process that calculates an actual absolute position of the steering rod 12.

Subsequent to the initialization process, the first controller 41 uses the rotation angle α1 of the first motor 17 to calculate a present value of the absolute position of the steering rod 12. More specifically, the first controller 41 converts the change amount of the rotation angle α1 into a first movement amount, which is the movement amount of the steering rod 12. The first controller 41 calculates the present value of the absolute position of the steering rod 12 by adding the first movement amount to the absolute position of the steering rod 12, which is obtained during the initialization process.

Further, the first controller 41 uses the target steerable angle θ* to calculate a target absolute position of the steering rod 12. The first controller 41 obtains the difference between the target absolute position and the actual absolute position of the steering rod 12 to control power feeding to the first motor 17 such that the difference is eliminated.

The second controller 42 controls the second motor 18. The second controller 42 obtains a current command value generated by the first controller 41. The second controller 42 obtains the rotation angle $\beta 1$ of the second motor 18, which is detected by the third rotation angle sensor 33, and the rotation angle $\beta 2$ of the second motor 18, which is detected by the fourth rotation angle sensor 34. Further, the second controller 42 obtains the rotation angle $\alpha 1$ of the first motor 17, which is detected by the first rotation angle sensor 31, and the rotation angle $\alpha 2$ of the first motor 17, which is detected by the second rotation angle sensor 32.

The second controller 42 executes a steering control that steers the steerable wheels 14 in correspondence with the steering state by driving and controlling the second motor 18.

When starting the execution of the steering control, the second controller 42 uses the rotation angle $\alpha 1$ of the first motor 17, which is detected by the first rotation angle sensor 31, and the rotation angle $\beta 1$ of the second motor 18, which is detected by the third rotation angle sensor 33, to execute an initialization process that calculates an actual absolute position of the steering rod 12.

Subsequent to the initialization process, the second controller 42 uses the rotation angle $\beta 1$ of the second motor 18 to calculate a present value of the absolute position of the steering rod 12. More specifically, the second controller 42 converts the change amount of the rotation angle $\beta 1$ into a second movement amount, which is the movement amount of the steering rod 12. The second controller 42 calculates the present value of the absolute position of the steering rod 12 by adding the second movement amount to the absolute position of the steering rod 12, which has been obtained during the initialization process.

Additionally, the second controller 42 controls power feeding to the second motor 18 using the current command value generated by the first controller 41.

As the first ball nut 15 and the second ball nut 16 rotate relative to the steering rod 12, the steering rod 12 receives torque acting around the axis of the steering rod 12. The direction of the torque that acts on the steering rod 12 as the first ball nut 15 rotates and the direction of the torque that acts on the steering rod 12 as the second ball nut 16 rotates are opposite directions. When the steering rod 12 attempts to be moved in a specific direction, the operation of the first motor 17 and the second motor 18 is controlled such that the first ball nut 15 and the second ball nut 16 rotate in opposite directions and the magnitude of the torque acting on the steering rod 12 as the first ball nut 15 and the second ball nut 16 rotate becomes the same. Thus, the torque that acts on the steering rod 12 as the first ball nut 15 rotates is counterbalanced by the torque that acts on the steering rod 12 as the second ball nut 16 rotates. This prevents the steering rod 12 from receiving the torque acting around the axis of the steering rod 12.

Controllers

The first controller 41 and the second controller 42 will now be described in detail.

Figure 2:
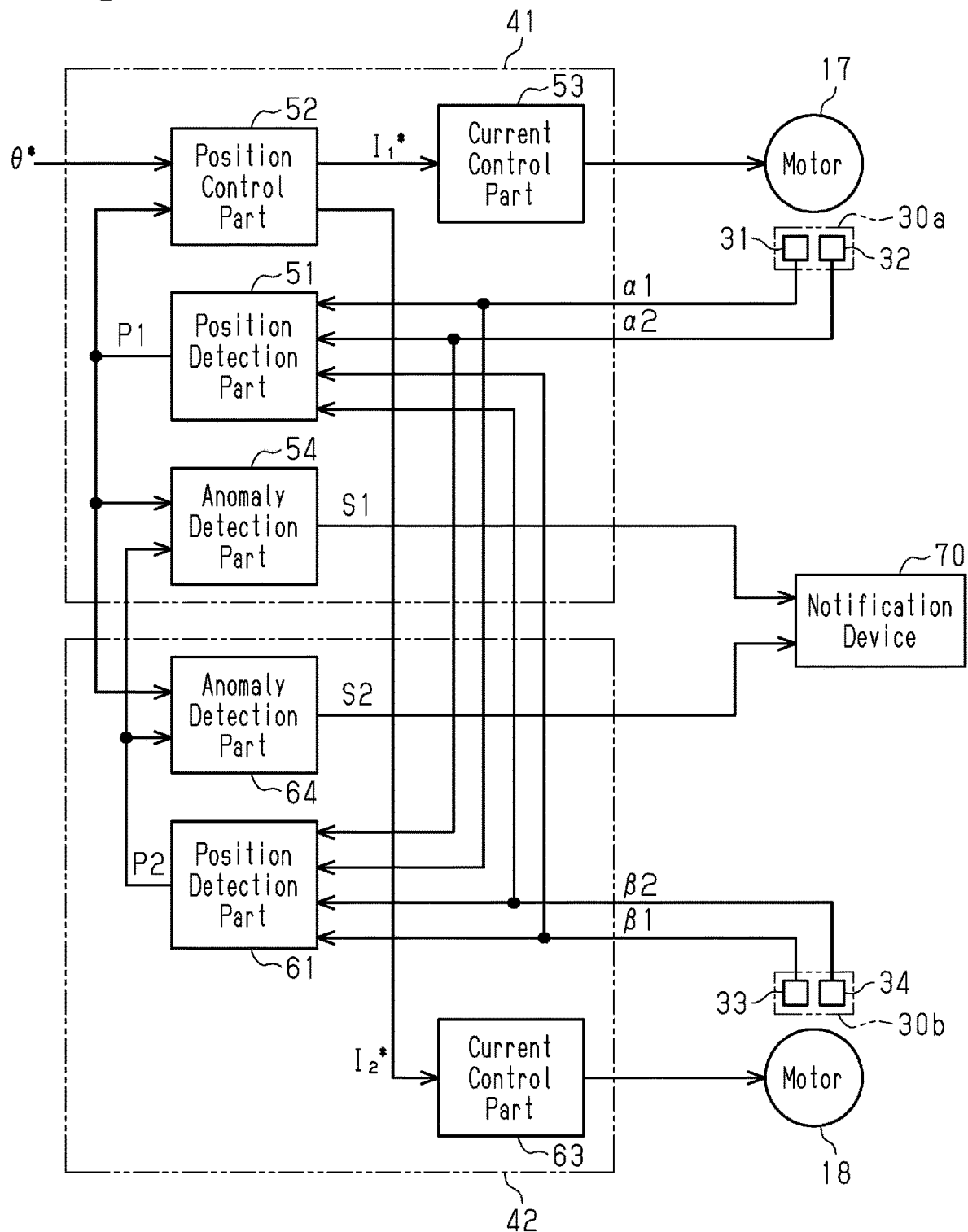
FIG. 2 is a block diagram of the controllers in the first embodiment.

As shown in FIG. 2, the first controller 41 includes a position detection part 51, a position control part 52, and a current control part 53.

When starting the execution of the steering control, the position detection part 51 executes an initialization process that calculates an absolute position P1 of the steering rod 12. More specifically, the position detection part 51 obtains the rotation angle $\alpha 1$ of the first motor 17, which is detected by the first rotation angle sensor 31, and the rotation angle $\beta 1$ of the second motor 18, which is detected by the third rotation angle sensor 33. The position detection part 51 uses the rotation angle $\alpha 1$ and $\beta 1$ to calculate the absolute position P1 of the steering rod 12.

The axial double angle of the first rotation angle sensor 31 and the axial double angle of the third rotation angle sensor 33 are set such that the rotation angle $\alpha 1$, which is detected by the first rotation angle sensor 31, does not match the rotation angle $\beta 1$, which is detected by the third rotation angle sensor 33, within the maximum movement range of the steering rod 12. Thus, a combination of the value of the rotation angle $\alpha 1$ and the value of the rotation angle $\beta 1$ individually corresponds to the absolute position P1 of the steering rod 12. This allows the absolute position P1 of the steering rod 12 to be detected using the combination of the two rotation angles $\alpha 1$ and $\beta 1$.

Subsequent to the initialization process, the position detection part 51 converts the change amount of the rotation angle $\alpha 1$ of the first motor 17 into the first movement amount, which is the movement amount of the steering rod 12. The position detection part 51 calculates the present value of the absolute position P1 of the steering rod 12 by adding the first movement amount to the absolute position of the steering rod 12 obtained during the initialization process. The midpoint of the calculation range of the present value of the absolute position P1, which is calculated by the position detection part 51, is set as the origin, i.e., a steering neutral position (steerable angle $\theta w = 0°$). The steering neutral position is the position of the steering rod 12 when the vehicle is traveling straight.

The position detection part 51 may calculate the absolute position P1 of the steering rod 12 using a first table, which is stored in a storage device of the first controller 41. The first table defines the relationship between the absolute position P1 of the steering rod 12 and the combination of the value of the rotation angle $\alpha 1$, which is detected by the first rotation angle sensor 31, and the value of the rotation angle $\beta 1$, which is detected by the third rotation angle sensor 33.

The position control part 52 calculates the target absolute position of the steering rod 12 using the target steerable angle $\theta^*$, which is calculated by the above-described upper controller. Since the steering rod 12 and the steerable wheels 14 move in conjunction with each other, the steering rod 12 correlates with the steerable angles $\theta w$ of the steerable wheels 14. Using the correlation, the target absolute position of the steering rod 12 can be obtained from the target steerable angle $\theta^*$. The position control part 52 obtains the difference between the target absolute position of the steering rod 12 and the actual absolute position P1 of the steering rod 12, which is calculated by the position detection part 51. The position control part 52 calculates a current command value $I_1^*$ for the first motor 17 and a current command value $I_2^*$ for the second motor 18 so as to eliminate the difference. Normally, the current command value $I_1^*$ and the current command value $I_2^*$ are set to be the same. Depending on product specifications or the like, the current command value $I_1^*$ and the current command value $I_2^*$ may be set to differ from each other.

The current control part 53 supplies the first motor 17 with the power corresponding to the current command value $I_1^*$, which is calculated by the position control part 52. This causes the first motor 17 to generate the torque corresponding to the current command value $I_1^*$.

As shown in FIG. 2, the second controller 42 includes a position detection part 61 and a current control part 63.

When starting the execution of the steering control, the position detection part 61 executes an initialization process that calculates an absolute position P2 of the steering rod 12. More specifically, the position detection part 61 obtains the rotation angle β1 of the second motor 18, which is detected by the third rotation angle sensor 33, and the rotation angle α1 of the first motor 17, which is detected by the first rotation angle sensor 31. The position detection part 61 uses the rotation angle β1 and al to calculate the absolute position P2 of the steering rod 12.

The axial double angle of the third rotation angle sensor 33 and the axial double angle of the first rotation angle sensor 31 are set such that the rotation angle β1, which is detected by the third rotation angle sensor 33, does not match the rotation angle α1, which is detected by the first rotation angle sensor 31, within the maximum movement range of the steering rod 12. Thus, a combination of the value of the rotation angle β1 and the value of the rotation angle α1 individually corresponds to the absolute position P2 of the steering rod 12. This allows the absolute position P2 of the steering rod 12 to be detected using the combination of the two rotation angles β1 and al.

Subsequent to the initialization process, the position detection part 61 converts the change amount of the rotation angle β1 of the second motor 18 into the second movement amount, which is the movement amount of the steering rod 12. The position detection part 61 calculates the present value of the absolute position P2 of the steering rod 12 by adding the second movement amount to the absolute position of the steering rod 12 obtained during the initialization process.

The position detection part 61 may calculate the absolute position P2 of the steering rod 12 using a second table, which is stored in a storage device of the second controller 42. The second table defines the relationship between the absolute position P2 of the steering rod 12 and the combination of the value of the rotation angle β1, which is detected by the third rotation angle sensor 33, and the value of the rotation angle α1, which is detected by the first rotation angle sensor 31. The midpoint of the calculation range of the absolute position P2, which is calculated by the position detection part 61, is set as the origin (steerable angle θw=0°).

The current control part 63 supplies the second motor 18 with the power corresponding to the current command value $I_2^*$, which is calculated by the position control part 52. This causes the second motor 18 to generate the torque corresponding to the current command value $I_2^*$.

Anomaly Detection Part

As described above, in the steering device 10, the belt transmission mechanism is used as a transmission mechanism that transmits the rotation of the first motor 17 and the second motor 18 to the steering rod 12. Thus, the steering device 10 may have the following problem.

More specifically, when a large reverse input load acts on the steering rod 12 due to, for example, the vehicle driving over a curb, the movement of the steering rod 12 in its axial direction causes the end of the steering rod 12 to strike the housing 11 (this is referred to as an end striking). In this case, physically restricting the movement of the steering rod 12 restricts the rotation of the first ball nut 15 and the belt 25 in the first transmission mechanism 21 and the rotation of the second ball nut 16 and the belt 28 in the second transmission mechanism 22. By contrast, the first motor 17 and the driving pulley 23 in the first transmission mechanism 21 and the second motor 18 and the driving pulley 26 in the second transmission mechanism 22 attempt to continue to rotate due to the inertial force of the first motor 17, the driving pulley 23, the second motor 18, and the driving pulley 26. This may cause tooth jumping in the belts 25 and 28. When the tooth jumping repeatedly occurs, wear of the teeth 25a and 28a of the belts 25 and 28 may develop.

To solve this problem, in the present embodiment, the following configuration is employed in order to detect tooth jumping.

As shown in FIG. 2, the first controller 41 includes an anomaly detection part 54, and the second controller 42 includes an anomaly detection part 64. The anomaly detection parts 54 and 64 respectively obtain the present value of the absolute position P1 of the steering rod 12, which is calculated by the position detection part 51, and the present value of the absolute position P2 of the steering rod 12, which is calculated by the position detection part 61. The anomaly detection parts 54 and 64 detect the tooth jumping of the belts 25 and 28 by comparing the absolute positions P1 and P2 of the steering rod 12.

Such detection is based on the following perspective. For example, when tooth jumping has occurred in the belt 25 of the first transmission mechanism 21 or the belt 28 of the second transmission mechanism 22, the rotation amount of the motor coupled to the transmission mechanism where the tooth jumping has occurred and the rotation amount of the motor coupled to the transmission mechanism where the tooth jumping has not occurred are different depending on the degree of the tooth jumping. Thus, the present value of the absolute position of the steering rod 12 calculated using the rotation angle of the motor coupled to the transmission mechanism where the tooth jumping has occurred and the present value of the absolute position of the steering rod 12 calculated using the rotation angle of the motor coupled to the transmission mechanism where the tooth jumping has not occurred are also different depending on the degree of the tooth jumping. Accordingly, it can be detected that tooth jumping has occurred in one of the belts 25 and 28 by comparing the present value of the absolute position P1 of the steering rod 12, which is calculated using the rotation angle α1 of the first motor 17, with the present value of the absolute position P2 of the steering rod 12, which is calculated using the rotation angle β1 of the second motor 18.

When detecting tooth jumping in the belts 25 and 28, the anomaly detection part 54 generates a notification command signal S1 for a notification device 70. When detecting tooth jumping in the belts 25 and 28, the anomaly detection part 64 generates a notification command signal S2 for the notification device 70. The notification device 70 is arranged in, for example, the passenger compartment. The notification command signals S1 and S2 are commands for causing the notification device 70 to execute a predetermined notification operation. The notification device 70 executes a notification operation using the notification command signal S1 or the notification command signal S2. Examples of the notification operation include the production of warning sounds and the displaying of a warning on a display.

Procedure for Anomaly Detection Process

The procedure for the anomaly detection process executed in the anomaly detection parts 54 and 64 will now be described with reference to the flowchart of FIG. 3. The processes in the flowchart are executed in a preset control cycle.

Figure 3:
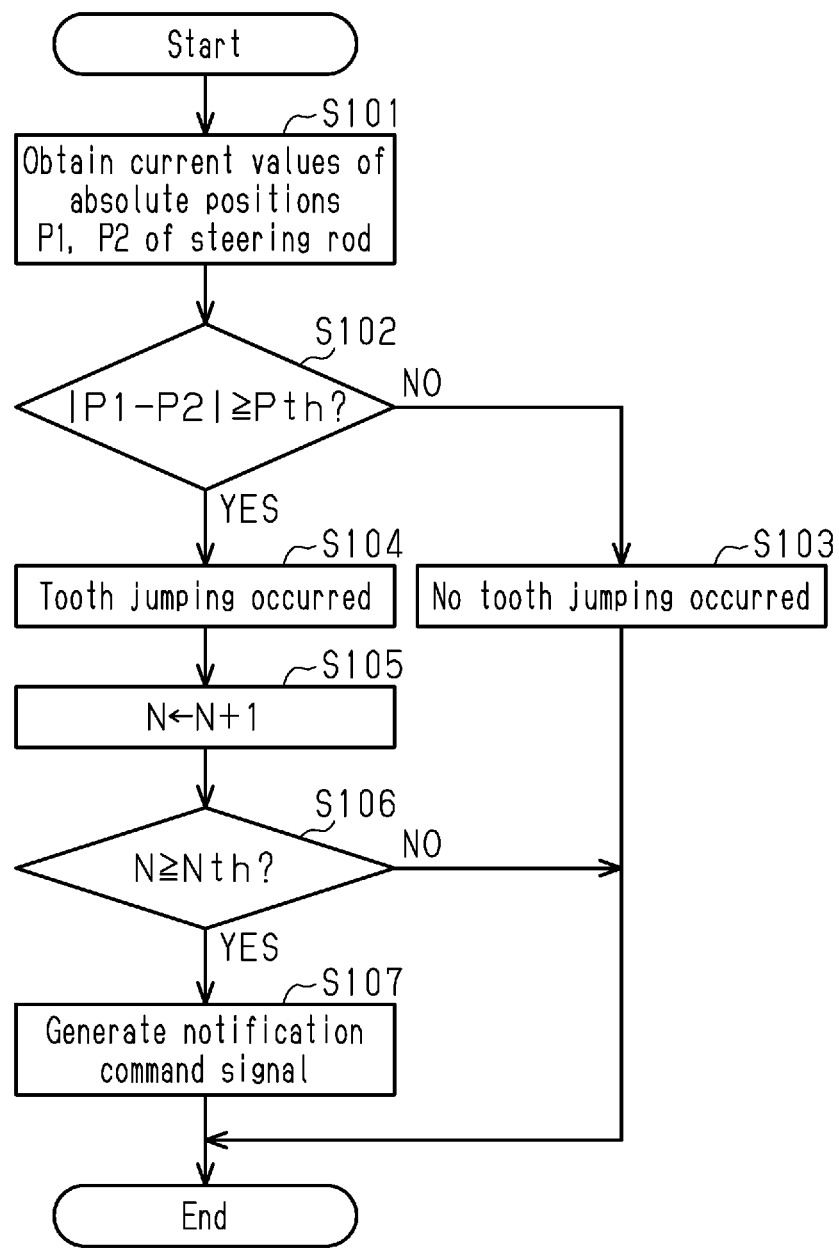
FIG. 3 is a flowchart illustrating the procedure for an anomaly detection process in the first embodiment.

As illustrated in the flowchart of FIG. 3, the anomaly detection part 54 obtains the present value of the absolute position P1 of the steering rod 12, which is calculated by the position detection part 51, and the present value of the absolute position P2 of the steering rod 12, which is calculated by the position detection part 61 (step S101).

Then, the anomaly detection part 54 determines whether the absolute value of the difference between the absolute position P1 and the absolute position P2 is greater than or equal to a tooth jumping determination threshold value Pth (step S102). The tooth jumping determination threshold value Pth is set in correspondence with the detection accuracy of tooth jumping required for the steering device 10. To detect tooth jumping by an amount corresponding to one or more of the teeth 25a and 28a of the belts 25 and 28, the tooth jumping determination threshold value Pth is set with reference to the movement amount of the steering rod 12 when the belts 25 and 28 rotate by an amount corresponding to only one tooth of the teeth 25a and 28a.

When determining that the absolute value of the difference between the absolute position P1 and the absolute position P2 is not greater than or equal to the tooth jumping determination threshold value Pth (step S102: NO), the anomaly detection part 54 determines that tooth jumping has not occurred in the belt 25 or 28 (step S103) and ends the process.

In the previous step S102, when determining that the absolute value of the difference between the absolute position P1 and the absolute position P2 is greater than or equal to the tooth jumping determination threshold value Pth (step S102: YES), the anomaly detection part 54 determines that tooth jumping has occurred in one of the belts 25 and 28 (step S104) and advances the process to the next step S105.

In step S105, the anomaly detection part 54 increments a count value N, which is the number of times where tooth jumping of the belts 25 and 28 has been detected. Incrementing means adding a predetermined number of times to the count value N. The predetermined number of times is, for example, 1.

Subsequently, the anomaly detection part 54 determines whether the count value N is greater than or equal to a count threshold value Nth (step S106). When tooth jumping of the belts 25 and 28 repeatedly occurs, wear of the teeth 25a and 28a of the belts 25 and 28 may develop. Thus, for example, the count threshold value Nth is set with reference to a preset number of times where a warning should be issued for the occurrence of tooth jumping in the belts 25 and 28.

When the count value N is not greater than or equal to the count threshold value Nth (step S106: NO), the anomaly detection part 54 ends the process.

When the count value N is greater than or equal to the count threshold value Nth (step S106: YES), the anomaly detection part 54 generates the notification command signal S1 for the notification device 70 (step S107) and ends the process. Upon receipt of the notification command signal S1, the notification device 70 executes a preset notification operation. The notification operation of the notification device 70 allows the vehicle driver to recognize that tooth jumping of the belts 25 and 28 has repeatedly occurred.

In the same manner as the anomaly detection part 54, the anomaly detection part 64 of the second controller 42 executes the processes of the above-described flowchart of FIG. 3. When the count value N is greater than or equal to the count threshold value Nth (step S106: YES), the anomaly detection part 64 generates the notification command signal S2 for the notification device 70 (step S107) and ends the process.

Advantages of First Embodiment

Accordingly, the first embodiment has the following advantages.

(1) When tooth jumping has occurred in the belt 25 of the first transmission mechanism 21 or the belt 28 of the second transmission mechanism 22, the present value of the absolute position P1 calculated using the rotation angle α1 of the first motor 17 and the present value of the absolute position P2 calculated using the rotation angle β1 of the second motor 18 are different from each other depending on the degree of the tooth jumping. Thus, the absolute value of the difference between the present value of the absolute position P1 and the present value of the absolute position P2 correspond to the degree of the tooth jumping. For example, as the degree of the tooth jumping becomes larger, the absolute value of the difference between the absolute position P1 and the absolute position P2 of the steering rod 12 becomes larger. By contrast, as the degree of the tooth jumping becomes smaller, the absolute value of the difference between the absolute position P1 and the absolute position P2 of the steering rod 12 becomes smaller.

Thus, it is determined that the tooth jumping has occurred in the belts 25 and 28 when the absolute value of the difference between the absolute position P1 and the absolute position P2 is greater than or equal to the tooth jumping determination threshold value Pth, which has been preset in order to determine the tooth jumping in the belts 25 and 28. Further, setting the tooth jumping determination threshold value Pth in correspondence with the detection accuracy of tooth jumping required for the steering device 10 allows for proper detection of the tooth jumping of the belts 25 and 28.

(2) Tooth jumping of the belts 25 and 28 is detected more accurately using the rotation angle α1 of the first motor 17, which is detected by the first detector 30a, and the rotation angle β1 of the second motor 18, which is detected by the second detector 30b. Depending on the setting of the tooth jumping determination threshold value Pth, tooth jumping by an amount corresponding to one of the teeth 25a and 28a of the belts 25 and 28 can be detected.

The reason for this is as follows. For example, a rotation angle sensor that detects, in an absolute value, a multi-turn rotation angle exceeding 360° such as a steering angle. This type of rotation angle sensor may have a lower resolution than the rotation angle sensors 31 to 34, which detect the rotation angles of the first motor 17 and the second motor 18. Thus, the detection accuracy of tooth jumping is ensured by utilizing the rotation angle sensors 31 to 34, which have a higher resolution.

(3) A warning is issued for the occurrence of tooth jumping when the count value N, which is the number of times where a tooth jumping has been detected, reaches the count threshold value Nth. This prevents excessive notification about the occurrence of tooth jumping in the belts 25 and 28.

Second Embodiment

A steering device according to a second embodiment will now be described. The present embodiment basically has the same configuration as the first embodiment, which is shown in FIGS. 1 and 2. Like or the same reference numerals are given to those components that are like or the same as the corresponding components of the first embodiment. Such components will not be described in detail. A configuration that does not include the position detection part 61 shown in FIG. 2 is employed as the second controller 42. Although the present embodiment differs from the first embodiment in the method for detecting tooth jumping of the belts, the tooth jumping of the belts is detected by executing the anomaly detection process corresponding to the flowchart in FIG. 3.

Figure 4:
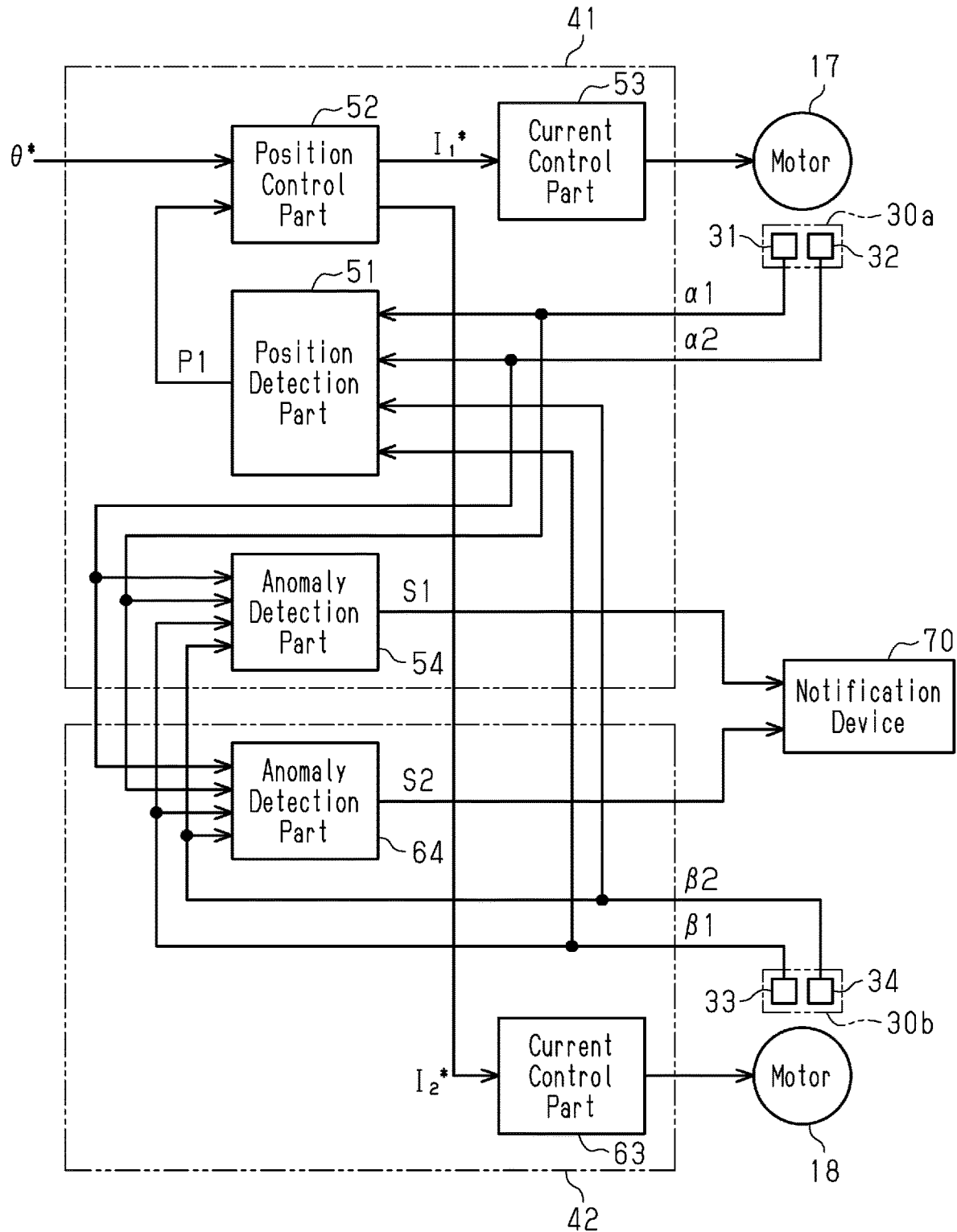
FIG. 4 is a block diagram of the controllers in a second embodiment.

As shown in FIG. 4, instead of the absolute positions P1 and P2 of the steering rod 12, the anomaly detection part 54 of the first controller 41 obtains, for example, the rotation angle α1 of the first motor 17, which is detected by the first rotation angle sensor 31, and the rotation angle β1 of the second motor 18, which is detected by the third rotation angle sensor 33. The anomaly detection part 54 detects tooth jumping of the belts 25 and 28 when the absolute value of the difference between the rotation angle α1 of the first motor 17 and the rotation angle β1 of the second motor 18 is greater than or equal to a tooth jumping determination threshold value. In the same manner as the anomaly detection part 54 of the first controller 41, the anomaly detection part 64 of the second controller 42 detects the tooth jumping of the belts 25 and 28. The anomaly detection parts 54 and 64 generate the notification command signals S1 and S2 for the notification device 70 when a count value, which is the number of times where tooth jumping has occurred, is greater than or equal to a count threshold value.

The tooth jumping determination threshold value is set in correspondence with the detection accuracy of tooth jumping required for the steering device 10. For example, to detect tooth jumping by an amount corresponding to one or more of the teeth 25a and 28a of the belts 25 and 28, the tooth jumping determination threshold value is set with reference to the rotation amounts of the first motor 17 and the second motor 18 when the belts 25 and 28 rotate by an amount corresponding to only one tooth of the teeth 25a and 28a.

When tooth jumping has occurred in the belt 25 of the first transmission mechanism 21 or the belt 28 of the second transmission mechanism 22, the rotation amount of the motor coupled to the transmission mechanism where the tooth jumping has occurred and the rotation amount of the motor coupled to the transmission mechanism where the tooth jumping has not occurred are different depending on the degree of the tooth jumping. Thus, the absolute value of the difference between the rotation angle α1 of the first motor 17 and the rotation angle β1 of the second motor 18 corresponds to the degree of tooth jumping. Accordingly, it is determined that tooth jumping has occurred in the belts 25 and 28 using the absolute value of the difference between the rotation angle α1 of the first motor 17 and the rotation angle β1 of the second motor 18. Further, setting the tooth jumping determination threshold value in correspondence with the detection accuracy of tooth jumping required for the steering device 10 allows for proper detection of the tooth jumping of the belts 25 and 28.

Instead of the rotation angle α1 of the first motor 17 and the rotation angle β1 of the second motor 18, the anomaly detection parts 54 and 64 may obtain the rotation angle α2 of the first motor 17 and the rotation angle β2 of the second motor 18 and detect tooth jumping of the belts 25 and 28 using the value of the difference between the rotation angles α2 and β2.

The second embodiment has the following advantages in addition to the same advantages as advantages (1) to (3) of the first embodiment.

(4) Tooth jumping of the belts 25 and 28 is detected using the rotation angle α1 of the first motor 17, which is detected by the first rotation angle sensor 31, and the rotation angle β1 of the second motor 18, which is detected by the third rotation angle sensor 33, with the rotation angle α1 and the rotation angle β1 unchanged. This facilitates detection of the tooth jumping of the belts 25 and 28 without calculating, for example, the absolute positions P1 and P2 of the steering rod 12.

(5) The configuration that does not include the position detection part 61, which is shown in FIG. 2, is employed as the second controller 42. This simplifies the configuration of the second controller 42.

Third Embodiment

A steering device according to a third embodiment will now be described. The present embodiment basically has the same configuration as the first embodiment, which is shown in FIGS. 1 and 2. Like or the same reference numerals are given to those components that are like or the same as the corresponding components of the first embodiment. Such components will not be described in detail. The present embodiment differs from the first embodiment in the method for calculating the absolute positions P1 and P2 of the steering rod 12.

Figure 5:
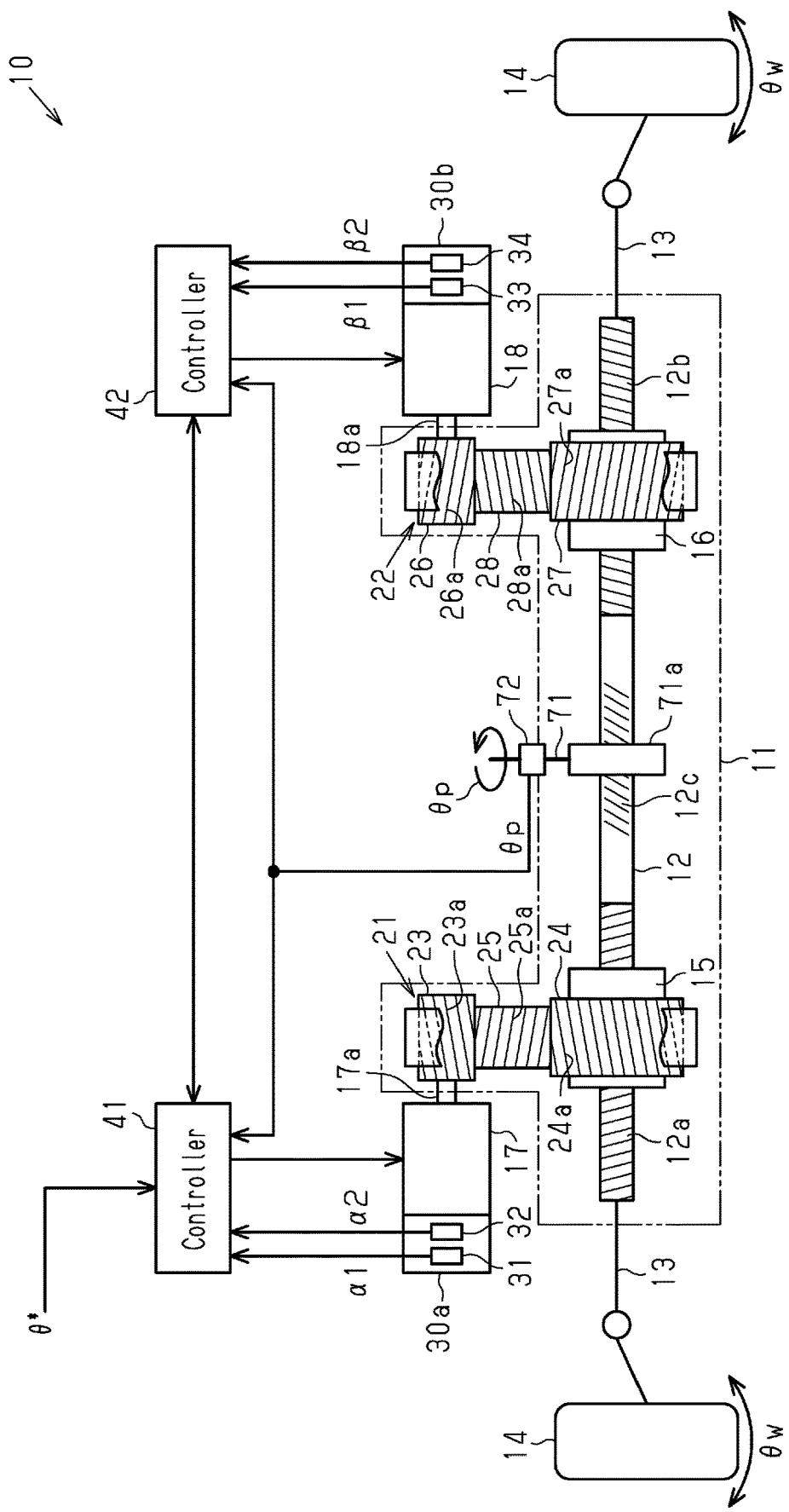
FIG. 5 is a diagram showing the structure of the steering device in a third embodiment.

As shown in FIG. 5, the steering device 10 includes a pinion shaft 71. The pinion shaft 71 is rotationally supported by the housing 11. The pinion shaft 71 is arranged so as to intersect the central portion of the steering rod 12 (i.e., the portion between the first ball screw part 12a and the second ball screw part 12b). The pinion shaft 71 includes pinion teeth 71a, which mesh with rack teeth 12c on the central portion of the steering rod 12. The pinion shaft 71 rotates in conjunction with the movement of the steering rod 12. The movement amount of the steering rod 12 relative to a single rotation of the pinion shaft 71 is referred to as a stroke-per-rotation.

The pinion shaft 71 is provided with an absolute angle sensor 72. The absolute angle sensor 72 is supported by the housing 11. The absolute angle sensor 72 detects, in an absolute angle, a multi-turn rotation angle θp exceeding 360° of the pinion shaft 71.

The first controller 41 calculates the present value of the absolute position P1 of the steering rod 12 using the rotation angle θp of the pinion shaft 71, which is detected by the absolute angle sensor 72, and the rotation angle α1 of the first motor 17, which is detected by the first rotation angle sensor 31. The second controller 42 calculates the present value of the absolute position P2 of the steering rod 12 using the rotation angle θp of the pinion shaft 71, which is detected by the absolute angle sensor 72, and the rotation angle β1 of the second motor 18, which is detected by the third rotation angle sensor 33.

Figure 6:
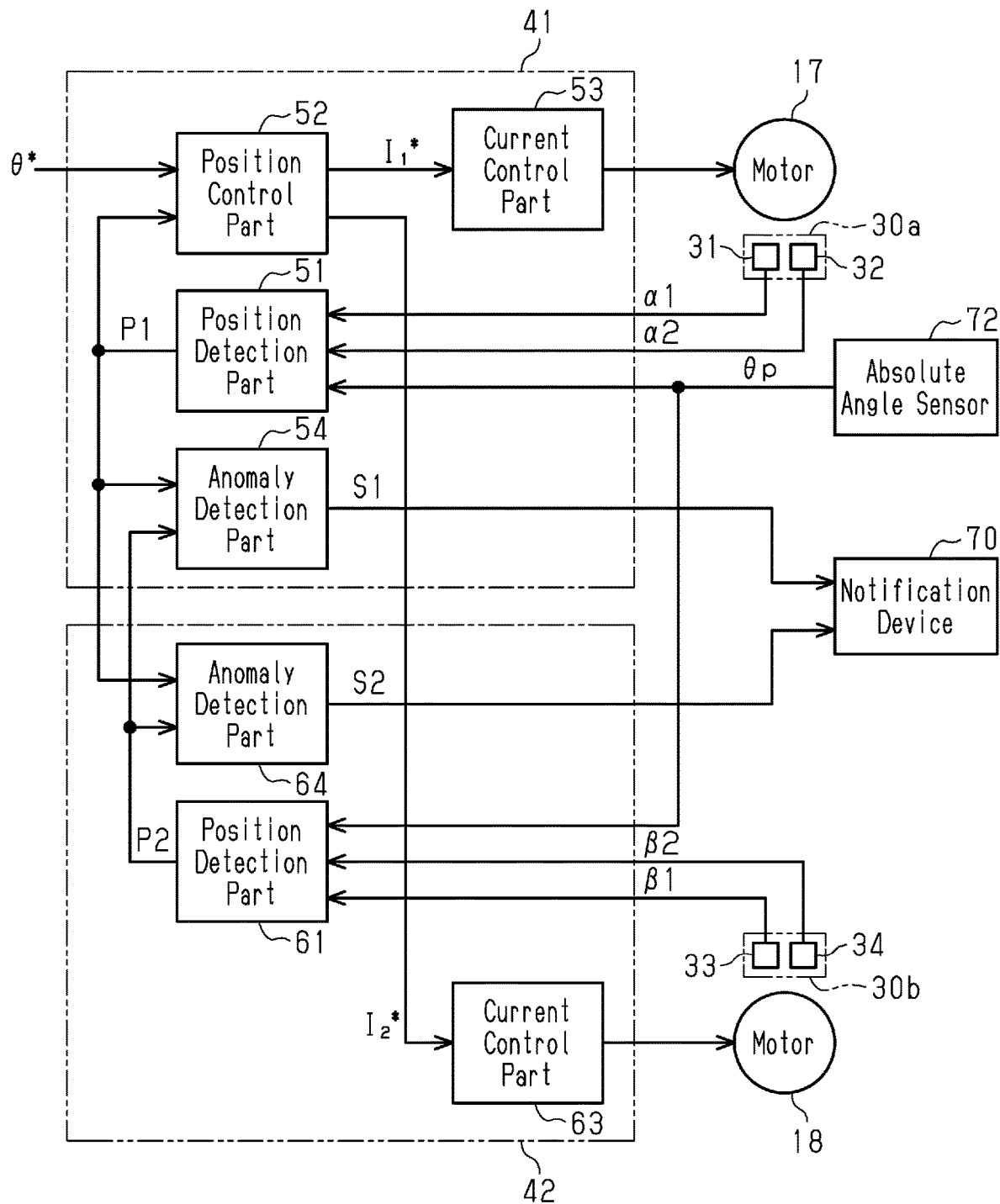
FIG. 6 is a block diagram of the controllers in the third embodiment.

As shown in FIG. 6, the position detection part 51 of the first controller 41 executes, when starting the execution of the steering control, an initialization process that calculates the absolute position P1 of the steering rod 12 using the rotation angle θp of the pinion shaft 71, which is detected by the absolute angle sensor 72. More specifically, the position detection part 51 divides the rotation angle θp of the pinion shaft 71, which is detected by the absolute angle sensor 72, by 360°. The position detection part 51 converts the rotation angle θp of the pinion shaft 71 into the position of the steering rod 12 by multiplying the divided value by the stroke-per-rotation. The position detection part 51 sets the converted value as an initial value of the absolute position P1 of the steering rod 12.

Subsequent to the initialization process, the position detection part 51 converts the change amount of the rotation angle α1 of the first motor 17 into the first movement amount, which is the movement amount of the steering rod 12. The position detection part 51 calculates the present value of the absolute position P1 of the steering rod 12 by adding the first movement amount to the absolute position P1 of the steering rod 12, which is obtained during the initialization process.

Further, the position detection part 61 of the second controller 42 executes, when starting the execution of the steering control, an initialization process that calculates the absolute position P2 of the steering rod 12 using the rotation angle θp of the pinion shaft 71, which is detected by the absolute angle sensor 72.

Subsequent to the initialization process, the position detection part 61 converts the change amount of the rotation angle θ1 of the second motor 18 into the second movement amount, which is the movement amount of the steering rod 12. The position detection part 51 calculates the present value of the absolute position P2 of the steering rod 12 by adding the second movement amount to the absolute position P2 of the steering rod 12, which is obtained during the initialization process.

The anomaly detection parts 54 and 64 detect tooth jumping of the belts 25 and 28 by executing the anomaly detection process illustrated in the flowchart of FIG. 3. The third embodiment has the same advantages as advantages (1) to (3) of the first embodiment.

Fourth Embodiment

A steering device according to a fourth embodiment will now be described. The present embodiment basically has the same configuration as the first embodiment, which is shown in FIGS. 1 and 2. Like or the same reference numerals are given to those components that are like or the same as the corresponding components of the first embodiment. Such components will not be described in detail. The present embodiment differs from the first embodiment in the method for calculating the absolute positions P1 and P2 of the steering rod 12. The steering device 10 is applied to a by-wire type steering system in which the transmission of power between the steering wheel and the steerable wheels 14 is separated.

Figure 7:
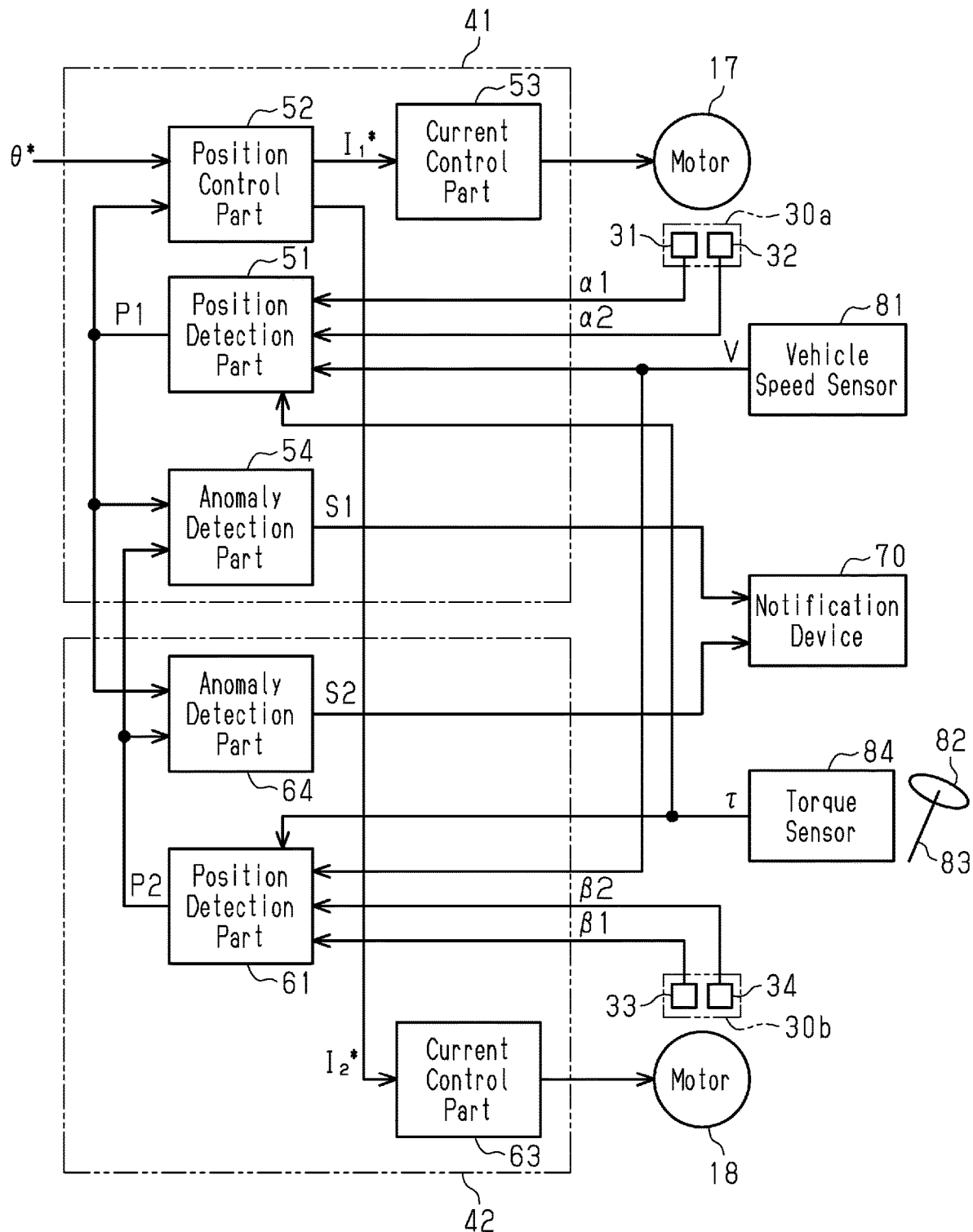
FIG. 7 is a block diagram of the controllers in a fourth embodiment.

Referring to FIG. 7, the position detection parts 51 and 61 learn the steering neutral position, which is the position of the steering rod 12 when the vehicle is traveling straight. The position detection parts 51 and 61 determine that the vehicle is traveling straight when, for example, the following three determination conditions (A1) to (A3) have all been satisfied. The determination conditions for straight traveling may be changed depending on, for example, product specifications.

(A1) The vehicle speed V is greater than or equal to a vehicle speed threshold value. The vehicle speed V is detected by an onboard vehicle speed sensor 81.

(A2) A time change amount of the rotation angle α1 of the first motor 17 or the rotation angle β1 of the second motor 18 (i.e., the absolute value of the rotation speed of the first motor 17 or the second motor 18) continues to be less than or equal to a predetermined value for a set period of time or longer.

(A3) A steering torque τ, which is applied to a steering shaft 83 by operating a steering wheel 82, continues to be less than or equal to a torque threshold value for a set period of time or longer. The steering torque τ is detected by a torque sensor 84, which is arranged in the steering shaft 83.

When determining that the vehicle is traveling straight, the position detection parts 51 and 61 calculate the steering neutral position, which is the position of the steering rod 12 when the steerable angle θw is zero, in accordance with a learning algorithm stored in a storage device (not shown).

The position detection parts 51 and 61 store the calculated steering neutral position in the storage device as the latest learning value.

After calculating the steering neutral position of the steering rod 12, the position detection part 51 uses the steering neutral position as a reference point to calculate the present value of the absolute position P1 of the steering rod 12 on the basis of a position change amount from the reference point. That is, the position detection part 51 converts the change amount of the rotation angle α1 of the first motor 17 into the first movement amount, which is the movement amount of the steering rod 12. The position detection part 51 calculates the absolute position P1 of the steering rod 12 by adding the first movement amount to the steering neutral position of the steering rod 12.

In addition, after calculating the steering neutral position of the steering rod 12, the position detection part 61 uses the steering neutral position as a reference point to calculate the present value of the absolute position P2 of the steering rod 12 on the basis of a position change amount from the reference point. That is, the position detection part 61 converts the change amount of the rotation angle θ1 of the second motor 18 into the second movement amount, which is the movement amount of the steering rod 12. The position detection part 61 calculates the absolute position P2 of the steering rod 12 by adding the second movement amount to the steering neutral position of the steering rod 12.

The position detection part 51 may calculate the present value of the absolute position P1 of the steering rod 12 using the rotation angle α2 of the first motor 17 detected by the second rotation angle sensor 32 instead of the first rotation angle sensor 31. Further, the position detection part 61 may calculate the present value of the absolute position P2 of the steering rod 12 using the rotation angle β2 of the second motor 18 detected by the fourth rotation angle sensor 34 instead of the third rotation angle sensor 33.

The anomaly detection parts 54 and 64 detect tooth jumping of the belts 25 and 28 by executing the anomaly detection process illustrated in the flowchart of FIG. 3. The fourth embodiment has the same advantages as advantages (1) to (3) of the first embodiment.

Modifications

The first to fourth embodiments may be modified as follows.

In the first, third, and fourth embodiments, tooth jumping of the belts 25 and 28 is detected through the comparison of the absolute positions P1 and P2 of the steering rod 12. However, the state quantities used to detect the tooth jumping are not limited to the absolute positions P1 and P2 of the steering rod 12. Instead, the tooth jumping of the belts 25 and 28 may be detected through the comparison of state quantities that are convertible into the absolute positions P1 and P2. Examples of the state quantities convertible into the absolute positions P1 and P2 of the steering rod 12 include an absolute angle that indicates a rotation angle of the output shaft 17a of the first motor 17 and a multi-turn rotation angle exceeding 360° and an absolute angle that indicates a rotation angle of the output shaft 18a of the second motor 18 and a multi-turn rotation angle exceeding 360°.

In this case, the position detection part 51 calculates, for example, the present value of an absolute angle θm1 of the output shaft 17a of the first motor 17 using the rotation angle α1. Further, the position detection part 61 calculates, for example, the present value of an absolute angle θm2 of the output shaft 18a of the second motor 18 using the rotation angle β1. In this case, the midpoint of the calculation range of the absolute angle θm1 and the midpoint of the calculation range of the absolute angle θm2 are set to be the same. The midpoint may be, for example, an absolute angle when the vehicle is traveling straight. In the same manner as when comparing the absolute positions P1 and P2 of the steering rod 12, the position detection parts 51 and 61 detect the tooth jumping of the belts 25 and 28 by comparing the absolute angles θm1 and θm2.

The state quantities convertible into the absolute positions P1 and P2 of the steering rod 12 do not have to be the absolute angles of the output shaft 17a of the first motor 17 and the output shaft 18a of the second motor 18. Instead, the state quantities convertible into the absolute positions P1 and P2 may be, for example, the steerable angles θw of the steerable wheels 14 or the rotation angle θp of the pinion shaft 71.

In each of the embodiments, the first ball screw part 12a may be a left-hand thread and the second ball screw part 12b may be a right-hand thread. The first ball screw part 12a and the second ball screw part 12b simply need to have the relationship of a reverse screw. Alternatively, both of the first ball screw part 12a and the second ball screw part 12b may be right-hand threads or left-hand threads. When this structure is employed, the steering rod 12 is provided with a rotation restriction portion that restricts the rotation of the steering rod 12 relative to the housing 11.

In each of the embodiments, the tooth jumping determination threshold value Pth is set with reference to the movement amount of the steering rod 12 when the belts 25 and 28 rotate by an amount corresponding to only one tooth of the teeth 25a and 28a. Instead, the tooth jumping determination threshold value Pth may be set with reference to the movement amount of the steering rod 12 when rotating by an amount corresponding to two, three, or more teeth of the teeth 25a and 28a. The tooth jumping determination threshold value Pth is set to an appropriate value in correspondence with the detection accuracy of tooth jumping required for the steering device 10.

In each of the embodiments, instead of the target steerable angle θ*, the onboard upper controller may calculate the target absolute position of the steering rod 12 corresponding to the steering state or traveling state of the vehicle. In this case, the first controller 41 obtains the target absolute position of the steering rod 12 calculated by the upper controller and uses the obtained target absolute position to calculate the current command value $I_1^*$ for the first motor 17 and the current command value $I_2^*$ for the second motor $1_2^*$.

In each of the embodiments, depending on product specifications or the like, the processes of step S105 and S106 may be omitted from the flowchart of FIG. 3. In this case, when detecting tooth jumping of the belts 25 and 28 (step S102: YES), the anomaly detection parts 54 and 64 instantly generate the notification command signals S1 and S2.

In each of the embodiments, the first controller 41 and the second controller 42 may be provided as a single controller.

In each of the embodiments, the first detector 30a may include only one of the first rotation angle sensor 31 and the second rotation angle sensor 32. Further, the second detector 30b may include only one of the third rotation angle sensor 33 and the fourth rotation angle sensor 34.

In each of the embodiments, the condition for generating the notification command signals S1 and S2 in the anomaly detection parts 54 and 64 may be set as follows. That is, the anomaly detection parts 54 and 64 store the history of the absolute positions P1 and P2 of the steering rod 12, which are calculated by the position detection parts 51 and 61. More specifically, the position detection parts 51 and 61 store the absolute positions P1 and P2 of the steering rod 12, for example, at the point in time in which tooth jumping is detected. In a case where tooth jumping has occurred at a preset number of times or more at specific rotation positions in the belts 25 and 28, the anomaly detection parts 54 and 64 generate the notification command signals S1 and S2 for the notification device 70. The rotation positions of the belts 25 and 28 where tooth jumping repeatedly occurs may be obtained as, for example, a remainder obtained by dividing, by the movement amount of the steering rod 12 per rotation of the belts 25 and 28, the absolute positions P1 and P2 of the steering rod 12 at the point in time in which tooth jumping has been detected. This allows for the detection of at which position of the belts 25 and 28 tooth jumping occurs.

In each of the embodiments, when the position detection parts 51 and 61 function to learn the steering neutral position of the steering rod 12, the anomaly detection parts 54 and 64 may detect tooth jumping of the belts 25 and 28 as follows. The anomaly detection parts 54 and 64 receive the information indicating that the position detection parts 51 and 61 have calculated the steering neutral position. With the vehicle traveling straight, the anomaly detection parts 54 and 64 compare the absolute positions P1 before and after the calculation of the steering neutral position by the position detection part 51. In other words, when the steering neutral position calculated by the position detection part 51 is stored in a storage device as the latest learning value, the anomaly detection parts 54 and 64 determine whether the absolute position P1 has changed. Additionally, the anomaly detection parts 54 and 64 compare the absolute positions P2 before and after the calculation of the steering neutral position by the position detection part 61. In other words, when the steering neutral position calculated by the position detection part 61 is stored as the latest learning value in a storage device, the anomaly detection parts 54 and 64 determine whether the absolute position P2 has changed. The anomaly detection parts 54 and 64 determine that tooth jumping has occurred in one of the belts 25 and 28 where the absolute position of the steering rod 12 has changed before and after the calculation of the steering neutral position.

The determination is based on a high probability that the value of the absolute position P1 of the steering rod 12 calculated by the position detection part 51 or the value of the absolute position P2 of the steering rod 12 calculated by the position detection part 61 differ from each other before and after the calculation of the steering neutral position of the steering rod 12 in a case where tooth jumping occurs between a certain point in time in which the steering neutral position is calculated during straight traveling of the vehicle and another point in time in which the steering neutral position is additionally calculated. In a case where the absolute position P1 has changed before and after the calculation of the steering neutral position, the anomaly detection parts 54 and 64 determine that tooth jumping has occurred in the belt 25. In a case where the absolute position P2 has changed before and after the calculation of the steering neutral position, the anomaly detection parts 54 and 64 determine that tooth jumping has occurred in the belt 28. This allows for the determination of whether tooth jumping has occurred in the belt 25 or 28.

In each of the embodiments, the anomaly detection parts 54 and 64 may detect tooth jumping of the belt 25 and 28 as follows. The anomaly detection parts 54 and 64 store the absolute positions P1 and P2 of the steering rod 12 at the point in time in which a first-time end striking occurred in a normal steering operation. In the normal steering operation, for example, the vehicle does not drive over a curb. The occurrence of the end striking of the steering rod 12 is detected on the basis of whether, for example, the position of the steering rod 12 has reached a limit position of the movable range of the steering rod 12. Subsequently, in a case where the second end striking in the normal steering operation occurred on the same side as the first-time end striking, the anomaly detection parts 54 and 64 compare the absolute positions P1 and P2 of the steering rod 12 at the point in time in which a second-time end striking occurred with the stored absolute positions P1 and P2 at the point in time in which the first-time end striking occurred. The anomaly detection parts 54 and 64 determine that tooth jumping has occurred in one of the belts 25 and 28 where the absolute position of the steering rod 12 has changed between the point in time in which the first-time end striking occurred and the point in time in which the second-time end striking occurred. In a case where the absolute position P1 has changed, the anomaly detection parts 54 and 64 determine that tooth jumping has occurred in the belt 25. In a case where the absolute position P2 has changed, the anomaly detection parts 54 and 64 determine that tooth jumping has occurred in the belt 28. This allows for the determination of whether tooth jumping has occurred in the belt 25 or 28.

In each of the embodiments, the anomaly detection parts 54 and 64 may detect whether tooth jumping has occurred in the belt 25 or 28 as follows. The anomaly detection parts 54 and 64 detect the rotation speeds and rotation directions of the first motor 17 and the second motor 18. The rotation speeds of the first motor 17 and the second motor 18 are obtained by, for example, differentiating the rotation angles $\alpha 1$ and $\alpha 2$ of the first motor 17 and the rotation angles $\beta 1$ and $\beta 2$ of the second motor 18. The rotation directions of the motors are obtained using, for example, changes in the rotation angles $\alpha 1$ and $\alpha 2$ and the rotation angles $\beta 1$ and $\beta 2$. The anomaly detection parts 54 and 64 monitor whether the rotation speeds of the first motor 17 and the second motor 18 each exceed a preset speed threshold value. For example, the speed threshold value is set with reference to a rotation speed at which tooth jumping is highly likely to occur. Further, the anomaly detection parts 54 and 64 store the rotation directions when the rotation speeds of the motors exceed the speed threshold values. In a case where the tooth jumping of the belts 25 and 28 has been detected, the anomaly detection parts 54 and 64 determine that the tooth jumping has occurred in one of the belts 25 and 28 where the absolute positions P1 and P2 changed in a direction corresponding to the rotation direction of the motor that rotated at a rotation speed exceeding the speed threshold value prior to the detection of the tooth jumping. This is based on the fact that tooth jumping of the belts 25 and 28 is more likely to occur as the rotation speed of the motor becomes higher. This allows for the determination of whether tooth jumping has occurred in the belt 25 or 28.

When the anomaly detection parts 54 and 64 are capable of determining whether tooth jumping has occurred in the belt 25 or 28, the anomaly detection parts 54 and 64 may limit the current supplied to one of the first motor 17 or the second motor 18 that corresponds to the belt where the tooth jumping has been detected. For example, the anomaly detection parts 54 and 64 generate control signals to the current control parts 53 and 63 of the controller that controls the motor corresponding to the belt where the tooth jumping has been detected. The current control parts 53 and 63 uses the control signals generated by the anomaly detection parts 54 and 64 to limit, to a value smaller than the value of the current that should be originally supplied, the value of the current supplied to the motor corresponding to the belt where the tooth jumping has been detected. The rotation of the motor corresponding to the belt where the tooth jumping has been detected is limited by an amount in which the current is limited. This allows for the extension of the life of the belt where the tooth jumping has been detected.

Each of the embodiments of the steering device 10 may be applied to a by-wire type steering system in which the transmission of power between a steerable wheel and steerable wheels is separated. The by-wire type steering system includes a reaction force motor, which is the generation source of a steering reaction force applied to the steering shaft, and a reaction force controller, which controls the driving of the reaction force motor. The reaction force controller, for example, calculates a target steering angle of the steering wheel using the steering state or traveling state of the vehicle. In this case, the first controller 41 obtains, as the target steerable angle $\theta^*$, the target steering angle calculated by the reaction force controller serving as the upper controller.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A steering device comprising:
a steering rod that includes two ball screw parts, the steering rod being configured to steer a steerable wheel by moving linearly;
two ball nuts respectively fastened to the two ball screw parts;
two motors each configured to generate a drive force;
two transmission mechanisms each including a toothed belt, the two transmission mechanisms being configured to transmit the drive force of each one of the two motors to a corresponding one of the ball nuts;
two detectors configured to respectively detect rotation angles of the two motors; and
a controller configured to control each of the two motors, wherein:
the controller is configured to detect tooth jumping of the belts using the rotation angles of the two motors that are detected by the two detectors,
one of the two motors is a first motor and the other one of the two motors is a second motor,
a detector of the two detectors that corresponds to the first motor is a first detector and a detector of the two detectors that corresponds to the second motor is a second detector, and
the controller is configured to:
calculate a first absolute position of the steering rod using the rotation angle of the first motor detected by the first detector;
calculate a second absolute position of the steering rod using the rotation angle of the second motor detected by the second detector; and detect the tooth jumping of the belt by comparing the first absolute position of the steering rod with the second absolute position of the steering rod.

2. The steering device according to claim 1, wherein the controller is configured to determine that the tooth jumping has occurred in the belt when an absolute value of a difference between the first absolute position of the steering rod and the second absolute position of the steering rod is greater than or equal to a threshold value that has been preset in order to determine the tooth jumping of the belt.

3. The steering device according to claim 1, wherein
the first detector and the second detector have axial double angles that differ from each other,
the controller is configured to execute, when starting execution of a steering control that steers the steerable wheel, an initialization process that calculates an absolute position of the steering rod using the rotation angle of the first motor and the rotation angle of the second motor, the rotation angle of the first motor being detected by the first detector, the rotation angle of the second motor being detected by the second detector, and
subsequent to the initialization process, the controller is configured to:
convert a change amount of the rotation angle of the first motor into a first movement amount, the rotation angle of the first motor being detected by the first detector, the first movement amount being a movement amount of the steering rod;
calculate a present value of the first absolute position of the steering rod by adding the first movement amount to the absolute position obtained through the initialization process;
convert a change amount of the rotation angle of the second motor into a second movement amount, the rotation angle of the second motor being detected by the second detector, the second movement amount being a movement amount of the steering rod; and
calculate a present value of the second absolute position of the steering rod by adding the second movement amount to the absolute position obtained through the initialization process.

4. The steering device according to claim 1, comprising:
a shaft that rotates in conjunction with the steering rod; and
an absolute angle sensor that detects an absolute rotation angle of the shaft, wherein
the controller is configured to execute, when starting execution of a steering control that steers the steerable wheel, an initialization process that calculates an absolute position of the steering rod using the absolute rotation angle of the shaft, the absolute rotation angle of the shaft being detected by the absolute angle sensor, and
subsequent to the initialization process, the controller is configured to:
convert a change amount of the rotation angle of the first motor into a first movement amount, the rotation angle of the first motor being detected by the first detector, the first movement amount being a movement amount of the steering rod;
calculate a present value of the first absolute position of the steering rod by adding the first movement amount to the absolute position obtained through the initialization process;
convert a change amount of the rotation angle of the second motor into a second movement amount, the rotation angle of the second motor being detected by the second detector, the second movement amount being a movement amount of the steering rod; and
calculate a present value of the second absolute position of the steering rod by adding the second movement amount to the absolute position obtained through the initialization process.

5. The steering device according to claim 1, wherein
when it is determined through satisfaction of a preset determination condition that a vehicle is traveling straight, the controller is configured to set a steering neutral position to a position of the steering rod during the straight traveling, the steering neutral position serving as a reference point for calculating an absolute position of the steering rod, and
subsequent to setting the steering neutral position of the steering rod, the controller is configured to:
convert a change amount of the rotation angle of the first motor into a first movement amount, the rotation angle of the first motor being detected by the first detector, the first movement amount being a movement amount of the steering rod;
calculate a present value of the first absolute position of the steering rod by adding the first movement amount to the steering neutral position;
convert a change amount of the rotation angle of the second motor into a second movement amount, the rotation angle of the second motor being detected by the second detector, the second movement amount being a movement amount of the steering rod; and
calculate a present value of the second absolute position of the steering rod by adding the second movement amount to the steering neutral position.

6. The steering device according to claim 1, wherein the controller is configured to execute a preset warning operation when a number of times where the tooth jumping has been detected is greater than or equal to a count threshold value.

7. A method for detecting an anomaly in a steering device, the steering device including a steering rod configured to steer a steerable wheel by moving linearly, two ball nuts respectively fastened to two ball screw parts of the steering rod, and two transmission mechanisms configured to transmit a drive force of each one of two motors to a corresponding one of the ball nuts through toothed belts, the method comprising:
detecting, by two detectors, rotation angles of the two motors, respectively; and
detecting tooth jumping of the belts using the rotation angles of the two motors that are detected by the two detectors, wherein:
one of the two motors is a first motor and the other one of the two motors is a second motor,
a detector of the two detectors that corresponds to the first motor is a first detector and a detector of the two detectors that corresponds to the second motor is a second detector, and
detecting the tooth jumping of the belts includes:
calculating a first absolute position of the steering rod using the rotation angle of the first motor detected by the first detector;
calculating a second absolute position of the steering rod using the rotation angle of the second motor detected by the second detector; and detecting the tooth jumping of the belt by comparing the first absolute position of the steering rod with the second absolute position of the steering rod.

\* \* \* \* \*